UNITED STATES PATENT OFFICE.

HENRY A. KOHMAN, OF PITTSBURGH, PENNSYLVANIA, CHARLES HOFFMAN, OF NEW ROCHELLE, NEW YORK, AND TRUMAN M. GODFREY, OF PITTSBURGH, PENNSYLVANIA, ASSIGNORS TO CHARLES ADAMS, TRUSTEE, OF NEW ROCHELLE, NEW YORK.

MANUFACTURE OF BREAD.

1,148,329.  Specification of Letters Patent.  Patented July 27, 1915.

No Drawing. Original application filed April 21, 1914, Serial No. 833,400. Divided and this application filed November 27, 1914. Serial No. 874,182.

*To all whom it may concern:*

Be it known that we, HENRY A. KOHMAN, residing in the city of Pittsburgh, Allegheny county, State of Pennsylvania, CHARLES HOFFMAN, residing in New Rochelle, Westchester county, State of New York, and TRUMAN M. GODFREY, residing in Pittsburgh, Allegheny county, State of Pennsylvania, have invented certain new and useful Improvements in the Manufacture of Bread; and we do hereby declare the following to be a full, clear, and exact description of the invention, such as will enable others skilled in the art to which it appertains to make and use the same.

In an application for Letters Patent of the United States Serial No. 833,400, filed by us under date of April 21, 1914, we have described certain improvements in the process of making leavened bread, said improvements comprising the incorporation of an appropriate haloid acid or an appropriate oxidizing haloid salt (excluding chlorates and the acids from which they are derived) with the yeast, flour and other ingredients of the dough batch, during the process of fermentation. The resultant effect is not only to improve the quality of the bread, but also to increase the yield of loaves of like weight from a given initial quantity of the bread-making ingredients, to lessen the quantity of yeast required for the fermentation, and to speed up the time required for aging or maturing of the dough during the fermenting operation, or, conversely, to lessen the amount of fermentation of the dough required to bring it to the standard degree of maturity.

The present application constitutes a division of application Serial No. 833,400, hereinbefore referred to, and is intended to cover particularly the employment of an oxidizing compound of iodin, in the process referred to; that is to say, iodic acid, or a suitable derivative thereof, as, for instance, an iodate, and particularly the iodate of potassium, although other iodates are likewise serviceable and fall within the intent and purpose of the present application, as, for instance, iodates of sodium, ammonium and calcium.

The invention is applicable, in practice, both to the manufacture of bread by the sponge process and by the straight dough process, which processes are so well known in the art that it is unnecessary to set them forth at length herein. The invention is particularly useful in connection with the manufacture of bread from bolted hard wheat flours and is characterized by a decided whitening or clearing up of the color of the ultimate product, although the remaining advantages, hereinbefore indicated, and particularly the features of aging and yeast-saving are made manifest in the manufacture of bread from other flours, as, for instance, rye flour, and Graham flour.

The iodin salt that we find particularly appropriate for the practice of the invention is potassium iodate, which we especially recommend. Iodic acid may also be used, as above indicated, as well as iodates of sodium, ammonium and calcium. When potassium iodate is employed, it is used, either in the sponge process or in the straight dough process, in the proportion of .005 part of potassium iodate to 1000 parts of flour in the dough batch, that is to say, approximately .008 ounce of potassium iodate to 100 pounds of flour. The potassium iodate is added to the batch, either at the commencement of the sponge process, or at the commencement of the straight dough process, and the batch is thoroughly stirred so as to obtain as homogeneous a mixture as possible. It is found that when used in the proportions hereinbefore noted, the employment of the potassium iodate permits the required fermentation of the batch within a given interval of time to take place with the employment of about 70% of the quantity of yeast usually required, *i. e.*, with a saving of 30% of yeast. This lessening of the fermentation required for bringing the dough to the normal degree of age or maturity results in a lesser consumption of sugar by the yeast, and consequently, a lesser production of alcohol and carbon dioxid, which, as is well known, are practically all ultimately driven off or eliminated in the bread-making process. This saving in the consumption of the sugar otherwise converted into alcohol and carbon dioxid amounts to about 1%, as calculated upon the weight of flour employed, and is manifested in an increased yield starting from a given dough batch. So also, it is found that the water-absorbing power of flour is increased by about 2.5% calculated upon the flour, in consequence of which the weight of dough from a given weight of flour is materially increased. In practice, therefore, there is a net increased yield in the loaves of bread obtainable from a given quantity of dough, which increased yield frequently amounts to as high as 3000 loaves in a total output of 100,000 loaves. We have also ascertained that the iodates can be employed for the purposes specified, without interfering with the action of certain salts used for assisting in the propagation of the yeast cells, as, for instance, the calcium salts and the ammonium salts. We wish it to be understood, therefore, that the practice of our invention is not confined to its use in the customary sponge process or straight dough process, but likewise extends to its use in said processes even though they may contemplate the employment of other salts.

What we claim is:

1. In the process of making leavened bread, which comprises incorporating an appropriate and innocuous oxidizing iodin compound with yeast, flour and other ingredients of the dough batch, and fermenting the batch; substantially as described.

2. The process of making leavened bread, which comprises incorporating an appropriate and innocuous alkali metal salt of an oxidizing acid of iodin with the yeast, flour and other ingredients of the dough batch, and fermenting the batch; substantially as described.

3. The process of making leavened bread, which comprises incorporating potassium iodate with the yeast, flour and other ingredients of the dough batch, and fermenting the batch; substantially as described.

4. The process of making leavened bread, which comprises incorporating about .005 part of potassium iodate to 1000 parts of flour with the yeast, flour and other ingredients of the dough batch, and fermenting the batch; substantially as described.

In testimony whereof we affix our signatures in the presence of two witnesses.

HENRY A. KOHMAN.
CHARLES HOFFMAN.
TRUMAN M. GODFREY.

Witnesses to the signatures of Henry A. Kohman and Truman M. Godfrey:
  E. STEVINSON,
  CHAS. A. CHANCE.

Witnesses to the signature of Charles Hoffman:
  J. BRINKMAN,
  A. HURLEY.

It is hereby certified that in Letters Patent No. 1,148,329, granted July 27, 1915, upon the application of Henry A. Kohman, of Pittsburgh, Pennsylvania, Charles Hoffman, of New Rochelle, New York, and Truman M. Godfrey, of Pittsburgh, Pennsylvania, for an improvement in "The Manufacture of Bread," an error appears in the printed specification requiring correction as follows: Page 2, line 25, claim 1, strike out the word "In" and commence the following article "the" with a capital $T$; and that the said Letters Patent should be read with this correction therein that the same may conform to the record of the case in the Patent Office.

Signed and sealed this 21st day of September, A. D., 1915.

[SEAL.] J. T. NEWTON,

*Acting Commissioner of Patents.*